United States Patent
Oh (10) Patent No.: US 8,127,244 B2
(45) Date of Patent: Feb. 28, 2012

(54) METHOD AND TERMINAL FOR DISPLAYING CHARACTER CAPACITY

(75) Inventor: Kuk Jin Oh, Incheon-si (KR)

(73) Assignee: LG Electronics Inc., Seoul (KR)

( * ) Notice: Subject to any disclaimer, the term of this patent is extended or adjusted under 35 U.S.C. 154(b) by 688 days.

(21) Appl. No.: 11/563,910

(22) Filed: Nov. 28, 2006

(65) Prior Publication Data

US 2007/0124704 A1     May 31, 2007

(30) Foreign Application Priority Data

Nov. 29, 2005     (KR) .................. 10-2005-0114809

(51) Int. Cl.
*G06F 17/00*     (2006.01)
(52) U.S. Cl. ........................ 715/780; 715/864
(58) Field of Classification Search ............... 715/780, 715/864
See application file for complete search history.

(56) References Cited

U.S. PATENT DOCUMENTS

| | | | | |
|---|---|---|---|---|
| 5,450,538 | A * | 9/1995 | Glaser et al. ............ | 715/236 |
| 6,845,488 | B1 * | 1/2005 | Shim et al. ............. | 715/815 |
| 7,278,099 | B2 * | 10/2007 | Pugliese ................ | 715/255 |
| 2004/0103158 | A1 * | 5/2004 | Vella et al. ............. | 709/206 |
| 2005/0027839 | A1 * | 2/2005 | Day et al. .............. | 709/223 |
| 2005/0180645 | A1 * | 8/2005 | Hasegawa et al. ....... | 382/239 |
| 2005/0283726 | A1 * | 12/2005 | Lunati ................ | 715/533 |
| 2006/0080618 | A1 * | 4/2006 | Kracht ................ | 715/780 |
| 2009/0176521 | A1 * | 7/2009 | Klassen et al. .......... | 455/466 |

FOREIGN PATENT DOCUMENTS

| | | |
|---|---|---|
| JP | 3050665 | 3/1991 |
| JP | 10334092 | 12/1998 |
| JP | 2000311039 | 11/2000 |

OTHER PUBLICATIONS

Sprint Wayback http://www.sprint.com Nov. 26, 2005, pp. 1-4.*
Sprint Wayback http:www.sprint.com, Nov. 26, 2005, pp. 1-4.*
English translation of Chinese Office Action dated Dec. 7, 2010 for Application 200610064027.2.
Nokia 8250 Specification, Nokia Mobile Corp.; dated Dec. 31, 2001; full Chinese specification and English translation of pp. 9-10.

* cited by examiner

*Primary Examiner* — Chat Do
*Assistant Examiner* — Andrea C Leggett
(74) *Attorney, Agent, or Firm* — KED & Associates, LLP (57) ABSTRACT

A method of displaying an available character capacity in a character entry window includes calculating an available character capacity based on characters entered by a user, displaying the entered characters in a character entry window, and displaying an indication of the available character capacity at a position in the character entry window adjacent to the last character entered by the user. A method of displaying an available character capacity on a graphical user interface includes calculating an available character capacity based on characters entered by a user, displaying the entered characters on the graphical user interface, and displaying an object in the graphical user interface in a specific color corresponding to the calculated available character capacity.

23 Claims, 6 Drawing Sheets

| Add Memo |
|---|
| A.GMjtwjafakggqak |
| dmjtagnj,jgjd.jgmp |
| wtmda.Gjpgwtn,d.J |
| dgjgd,ad.Admgmjtw |
| pgjgjg.Ad.Jgmtpmg |
| mgad.Da.Dj.Jd.Jmjg |
| jmg.D.Jd.Jd.J | Full! |

METHOD AND TERMINAL FOR DISPLAYING CHARACTER CAPACITY

This application claims the priority benefit of Korean Patent Application No. 10-2005-0114809, filed on Nov. 29, 2005, which is incorporated by reference herein, in its entirety.

BACKGROUND OF THE INVENTION

1. Field of the Invention

The present invention relates to a method and terminal for displaying a character capacity, and more particularly, to a method and terminal for allowing a user to enter a desired character, while simultaneously viewing a current character capacity.

2. Discussion of the Related Art

Some conventional mobile communication terminals perform a message transmission function, utilizing technologies, such as, for example, Short message Service (SMS), Long Message Service (LMS), Multimedia Messaging System (MMS) and Wireless Application Protocol (WAP). Some of these terminals also perform other communication functions, such as a voice communication function or a multimedia communication function.

Under many circumstances, message transmission communication is a more preferable form of communication than voice communication, due to factors such as cost and the content to be communicated, for example. Thus, the usage of message services has rapidly increased recently.

When a user prepares a message, the length of the message (in terms of characters included in the message) may be limited by the message transmission technology being used, or by the terminal the user is using to send the message. Some conventional terminals display, while a user is entering a message, the remaining character capacity of the message. These terminals display the character capacity at an area of the terminal screen which is outside a message entry window (for example at an upper or lower part of the screen). In this case, to view the character capacity, the user must divert his view from the message entry window where the entered message is displayed to the area of the screen where the character capacity is displayed, which is inconvenient to the user.

Figure 1:
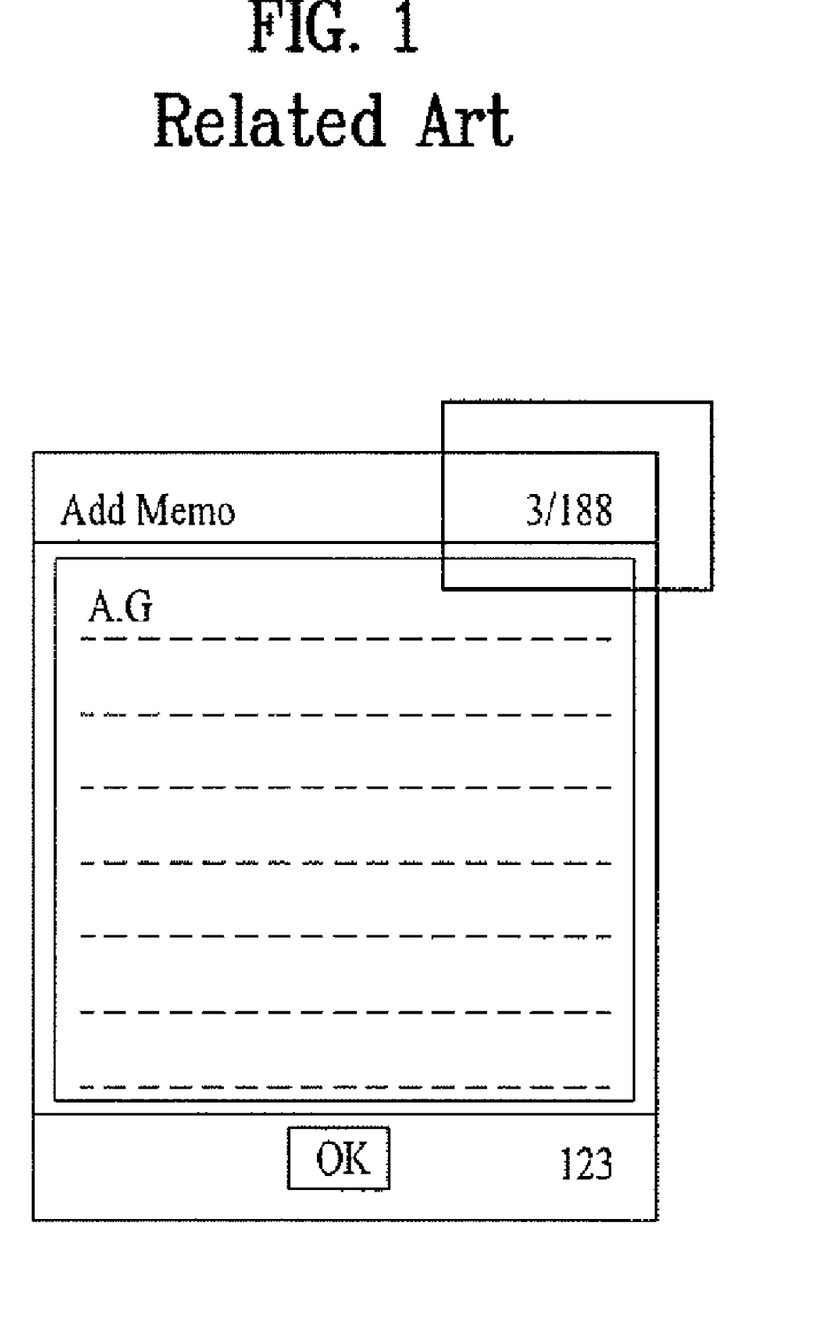
FIG. 1 shows an example of a conventional screen which is displayed when a user is entering a message.

FIG. 1 shows an example of a conventional screen which is displayed when a user is entering a message.

On the screen shown in FIG. 1, a message ("A.G") is displayed in a message entry-window, and a character count ("3") and a character capacity ("188") is displayed in the top right-hand corner of the screen.

Since the character count display is distant from the message-entry window, and since a user typically focuses their attention on the message-entry window while entering a message, the user will typically be unaware of how close his entered message has come to the maximum character length.

In this regard, to view the displayed character count, the user must divert his gaze from the message entry-window to the top right-hand corner of the screen shown in FIG. 1. In doing so, typically the user momentarily stops entering the message. This causes the message entry process to take longer.

SUMMARY OF THE INVENTION

One of the features of the present invention is that it allows a user, when entering text, to view an indication of a remaining character capacity of the text without diverting his view from the text being entered.

To achieve these features, there is provided a method of displaying an available character capacity in a character entry window which includes calculating an available character capacity based on characters entered by a user, displaying the entered characters in a character entry window, and displaying an indication of the available character capacity at a position in the text entry window adjacent to the last character entered by the user. The indication of the available character capacity may be displayed adjacent to a cursor.

There is also provided a method of displaying an available character capacity on a graphical user interface which includes calculating an available character capacity based on characters entered by a user, displaying the entered characters on the graphical user interface, and displaying an object in the graphical user interface in a specific color corresponding to the calculated available character capacity. The object may be an indication of the available character capacity, the displayed entered characters, a cursor adjacent to the displayed entered characters, a background of the graphical user interface, or an underline of the displayed entered characters.

There is also provided a terminal which displays an available character capacity in a character entry window. The terminal includes an input unit for entering characters, a display which displays a character entry window, and a controller which calculates an available character capacity based on characters entered by a user, controls the display to display the entered characters in the character entry window, and controls the display to display an indication of the available character capacity at a position in the character entry window adjacent to the last character entered by the user. The controller may control the display to display the indication of the available character capacity adjacent to a cursor.

There is also provided a terminal which displays an available character capacity on a graphical user interface. The terminal includes a input unit for entering characters, a display which displays a graphical user interface, and a controller which calculates an available character capacity based on characters entered by a user, controls the displays to display the entered characters on the graphical user interface, and controls the display to di splay an object in the graphical user interface in a specific color corresponding to the calculated available character capacity. The object lady be an indication of the available character capacity, the displayed entered characters, a cursor adjacent to the displayed entered characters, a background of the graphical user interface, or an underline of the displayed entered characters.

There is also provided a computer-readable medium which stores a program containing executable instructions for displaying an available character capacity in a character entry window. The program includes calculation instructions which a processor executes to calculate an available character capacity based on characters entered by a user, character display instructions which a processor executes to display the entered characters in a character entry window, and character capacity display instructions which a processor executes to display an indication of the available character capacity at a position in the character entry window adjacent to the last character entered by the user. The character capacity display instructions may include instructions to display the indication of the available character capacity adjacent to a cursor.

There is also provided a computer-readable medium which stores a program containing executable instructions for displaying an available character capacity on a graphical user interface. The program includes calculation instructions which a processor executes to calculate an available character capacity based on characters entered by a user, character display instructions which a processor executes to display the entered characters on the graphical user interface, and color control instructions which a processor executes to display an object in the graphical user interface in a specific color corresponding to the calculated available character capacity. The object may be an indication of the available character capacity, the displayed entered characters, a cursor adjacent to the displayed entered characters, a background of the graphical user interface, or an underline of the displayed entered characters.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 2:
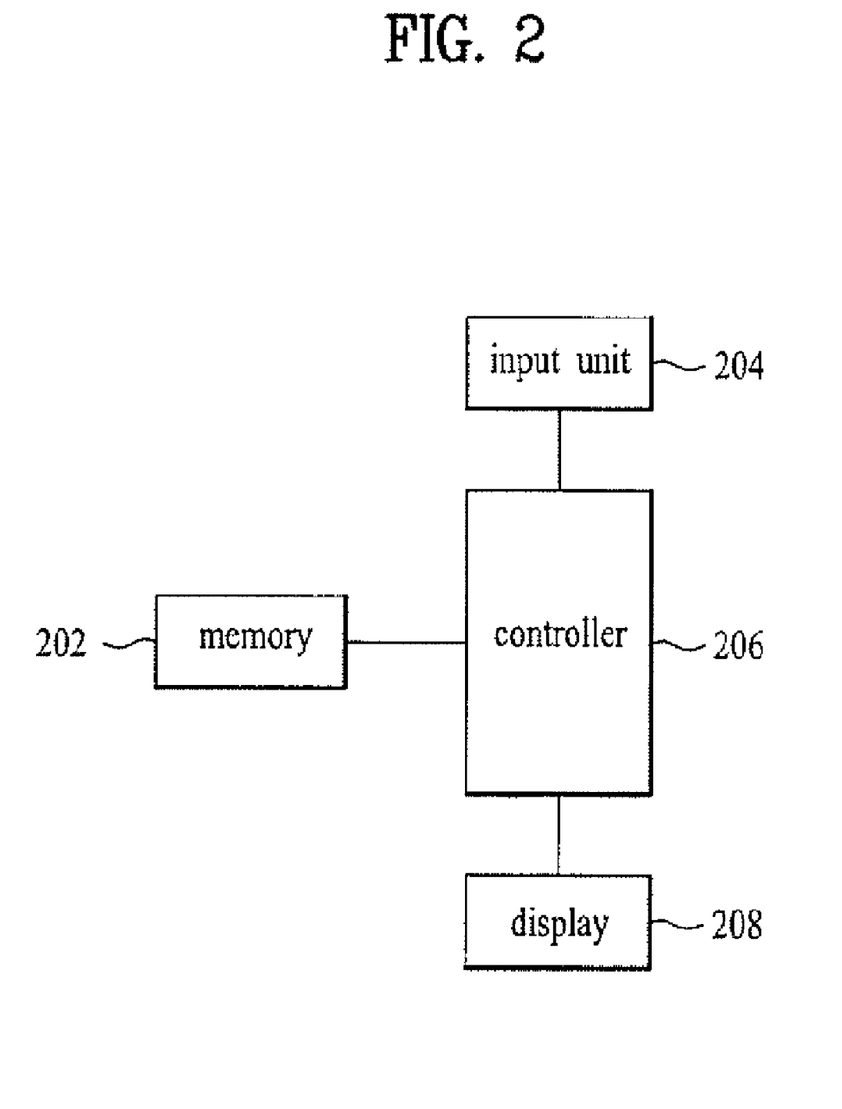
FIG. 2 is a block diagram of a terminal according to an aspect of the present invention.

FIG. 2 is a block diagram of a terminal according to an aspect of the present invention.

The terminal shown in FIG. 2 includes a memory 202, an input unit 204, a controller 206, and a display 208.

Examples of the terminal include, but are not limited to, a personal computer (such as, for example, a desktop or laptop computer), a mobile communication terminal (such as, for example, a mobile phone or PDA), or a video game terminal.

The memory 202 stores a program which controls overall operations of the terminal, and stores Input/Output (I/O) data for the overall operations of the terminal.

The memory 202 also stores a program which includes instructions for displaying an available character capacity on the display 208 of the terminal, and stores at least one character capacity value. The character capacity value is the maximum number of characters a user may enter when using a particular application. Examples of the application include, but are not limited to, a messaging application (such as, for example, an SMS messaging application or Instant Messaging (IM) application), a calendar application, a phone book application, a memo application, and other applications in which a user enters text. In such applications, the maximum number of characters a user may enter is limited, for example, by the capabilities of the display 208, by the amount of space reserved in memory 202 for storing text entered by the user, or, in the case of a messaging application, by the technology used to transmit a message. In some embodiments, the character capacity value may be a value set by the user.

In one embodiment, the program instructions instruct the terminal to display the available character capacity in a specific color or with a specific brightness which corresponds to the value of the available character capacity. Two non-limiting examples are described below.

As one example, if an RGB (Red, Green, Blue) color model is used, the RGB color values of an available character capacity indicator displayed on the display 208 may change based on the value of the available character capacity. Table 1 illustrates exemplary, non-limiting values

TABLE 1

| RGB Color Values of Available Character Capacity Indicator | | | | |
|---|---|---|---|---|
| Percentage of Character Capacity Reached | 0~30% | 30~60% | 60~90% | 90~100% |
| Color of Available Character Capacity Indicator (RGB) | Black (0, 0, 0) | Green (30, 147, 7) | Orange (255, 102, 0) | Red (252, 28, 4) |

As an example, if the values listed in Table 1 are used, and if the character capacity of an application is 100 characters, when a user begins entering text, the color of the available character capacity indicator will be black. When the user has entered more than 30 characters, the color of the indicator will change to green; when the user has entered more than 60 characters, the color of the indicator will change to orange; and when the user has entered more than 90 characters, the color of the indicator will change to red.

As another example, if an HSB (Hue, Saturation, Brightness) model is used, the HSB values of an available character capacity indicator displayed on the display 208 may change based on the value of the available character capacity. Table 2 illustrates exemplary, non-limiting values.

TABLE 2

| HSB Color Values of Available Character Capacity Indicator | |
|---|---|
| Percentage of Character Capacity Reached | HSB |
| 100~90% | (153, 70, 99) |
| 90~80% | (153, 70, 85) |
| 80~70% | (153, 70, 75) |
| 70~60% | (153, 70, 65) |
| 60~50% | (153, 70, 55) |
| 50~40% | (153, 70, 45) |
| 40~30% | (153, 70, 35) |
| 30~20% | (153, 70, 25) |
| 20~10% | (153, 70, 15) |

Regardless of whether the RGB or HSB color model is used, the color values corresponding to the available character capacity may be set by the user. As an alternative to changed the color or brightness of the available character capacity indicator, the color or brightness of one or more of the entered text, a cursor, an underline or a background of a graphical user interface may be changed.

When the user has entered the maximum number of characters allowed, the available character capacity indicator may read "full" or "end", for example, or include one or more special characters The input unit 204 may include a plurality of buttons for entering characters such as letters and numbers. Alternately, the input unit 204 may take other forms. For example, the input unit 204 may include a jog-dial, a stylus, a touch-screen, or a microphone which supplies user speech to a speech-recognition engine. When the user uses the input unit 204, the input unit 204 sends signals to the controller 206 corresponding to desired characters.

The display 208 may be implemented, for example, by a Liquid Crystal Display (LCD). Of course, other types of displays may be used without departing from the spirit and/or scope of the invention.

If the terminal is a mobile communication terminal, the display 208 may display information such as battery state information, signal reception intensity, date and time information, current mode status information, and other user information.

The display 208 displays a graphical user interface of an application selected by the user. If the application is one which allows a user to enter text (such as, for example, a messaging application), the controller 206 controls the display 208 to display text, entered by the user, in a text entry window. The display 208 also displays an indication of an available character capacity in the text entry window. The indication is displayed adjacent to the last character displayed on the display 208, or adjacent to a position in which the next entered character will be displayed e.g., adjacent to a cursor marking where the next entered character will be displayed). The indication may be displayed in a font different than the font used to display the entered text, and/or may have a different size.

In this case, there are a variety of methods for displaying the character-input capacity, and detailed description thereof will be described in detail with reference to the controller 206.

The controller 206 controls overall operations of the terminal. The controller 206 may include one or more of an arithmetic and logic unit (ALU), a register, a program counter, a command decoder, and a control circuit.

The character capacity of an application may depend on the language being used. For example, an English language character may take up one byte of space in memory, whereas a Korean language character may take up two bytes of space in memory. If the space available in the memory 202 for storing user-entered text is 100 bytes, then the character capacity would be 100 English language characters, or 50 Korean language characters. Of course, the character capacity may also be different from other languages as well. The controller 206 calculates the character capacity of an application based upon the language mode which presently set in the terminal.

If the terminal is set to a mode in which special characters or picture characters are used, the controller 206 may also calculate the character capacity of an application based upon this mode of characters as well.

In one embodiment, if the user is composing a message which is more than one page in length (such as an LMS message), the controller 206 may calculate a character capacity for each page, and a character capacity for the entire message. Accordingly, the display 208 may display an indication of the available character capacity of a page, and an indication of the available character capacity of an entire message.

Figure 3:
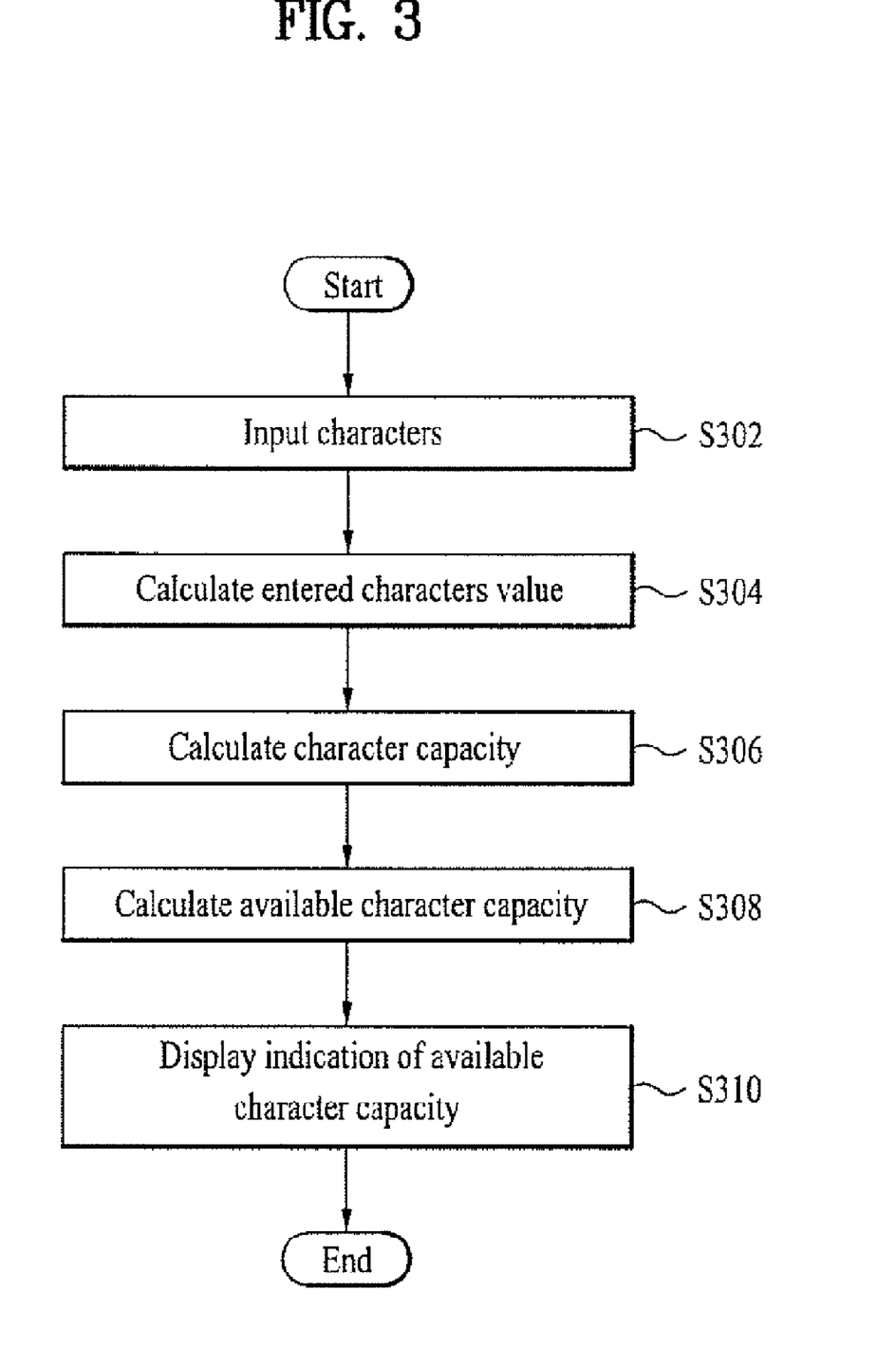
FIG. 3 is a flow chart illustrating a process performed by the controller in FIG. 2 to display an available character capacity, according to an aspect of the present invention.

FIG. 3 is a flow chart illustrating a process performed by the controller 206 to display an available character capacity, according to an aspect of the present invention.

The process illustrated in FIG. 3 is performed after a user has opened an application, and is performed in accordance with program instructions of the application. The process begins at step S302, where a user enters characters via the input unit 204. The entered characters may include, but are not limited to, numbers and letters of various languages, special characters, or graphic characters.

The terminal keeps track of the number of characters which have been entered by the user by calculating and storing an entered characters value in the memory 202 at step S304. This value may be represented in bytes, for example. In this regard, the application program may include instructions, executed by the controller 206, to update the entered characters value every time a character is entered or deleted.

The controller 206 calculates the character capacity of the opened application at step S306, based on multiple variables. As discussed above, the character capacity can depend on the size of the display 208, the amount of space reserved in memory 202 for storing text entered by the user, or, in the case of a messaging application, by the technology used to transmit a message. For example, the character capacity may differ depending upon whether SMS messaging, LMS messaging, or MMS messaging is being used. The character capacity may also depend on the type of characters being used (such as, the language). The controller 206 may make the character capacity calculated based on instructions of the application program.

Next, the controller 206 calculates an available character capacity, based on the character capacity of the application and the entered characters value at step S308. The available character capacity may be represented, for example, as the number of remaining characters a user may enter, or as a percentage of character capacity still available. For example, if the character capacity of an application is 200 characters, and the user has entered 20 characters, the available character capacity can be represented as 180 characters, or 90%. This calculation may be performed based on instructions in the application program.

The terminal displays an indication of the available character capacity on the display 208 at step S310, based on instructions in the application program. The indication of the available character capacity may be displayed adjacent to the last character displayed on the display 208, or adjacent to a position in which the next entered character will be displayed (e.g., adjacent to a cursor marking where the next entered character will be displayed).

The terminal may display the indication of the available character capacity, in a color, brightness, size and/or font different from that of the text entered by the user. As discussed above, the color or brightness of the indicator may change in accordance with the value of the available character capacity. As an alternative, the color and/or brightness of an underline may change in accordance with the value of the available character capacity.

When the available character capacity reaches zero, the terminal may display "full", "end", or special characters on the display 208. In this case, these characters may blink. As an alternative, the text entered by the user may blink when the available character capacity reaches zero. As another alternative, the terminal may output a sound to indicate that the available character capacity has reached zero.

The steps S302 to S310 are repeated as the user continues to enter text in the application.

Figure 4A:
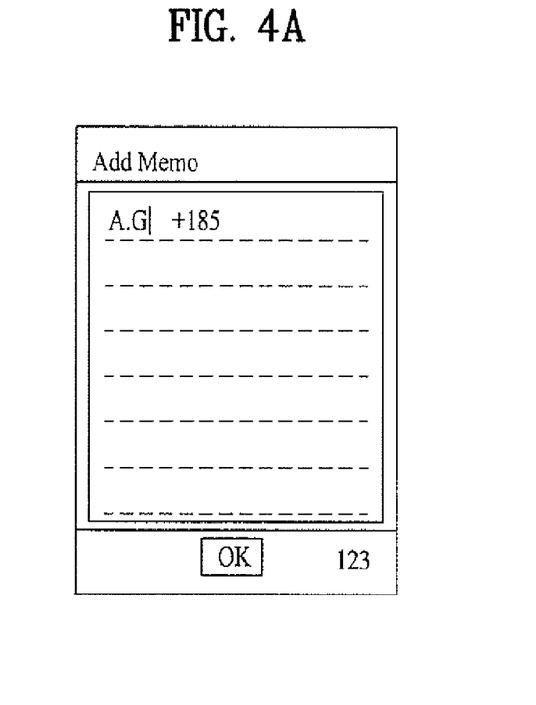
FIGS. 4A to 4C illustrate an exemplary graphical user interface according to an aspect of the present invention.
Figure 4B:
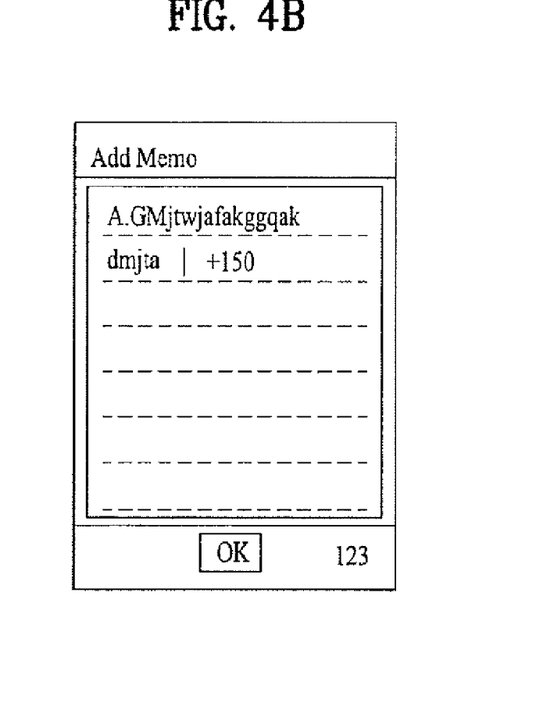
Figure 4C:
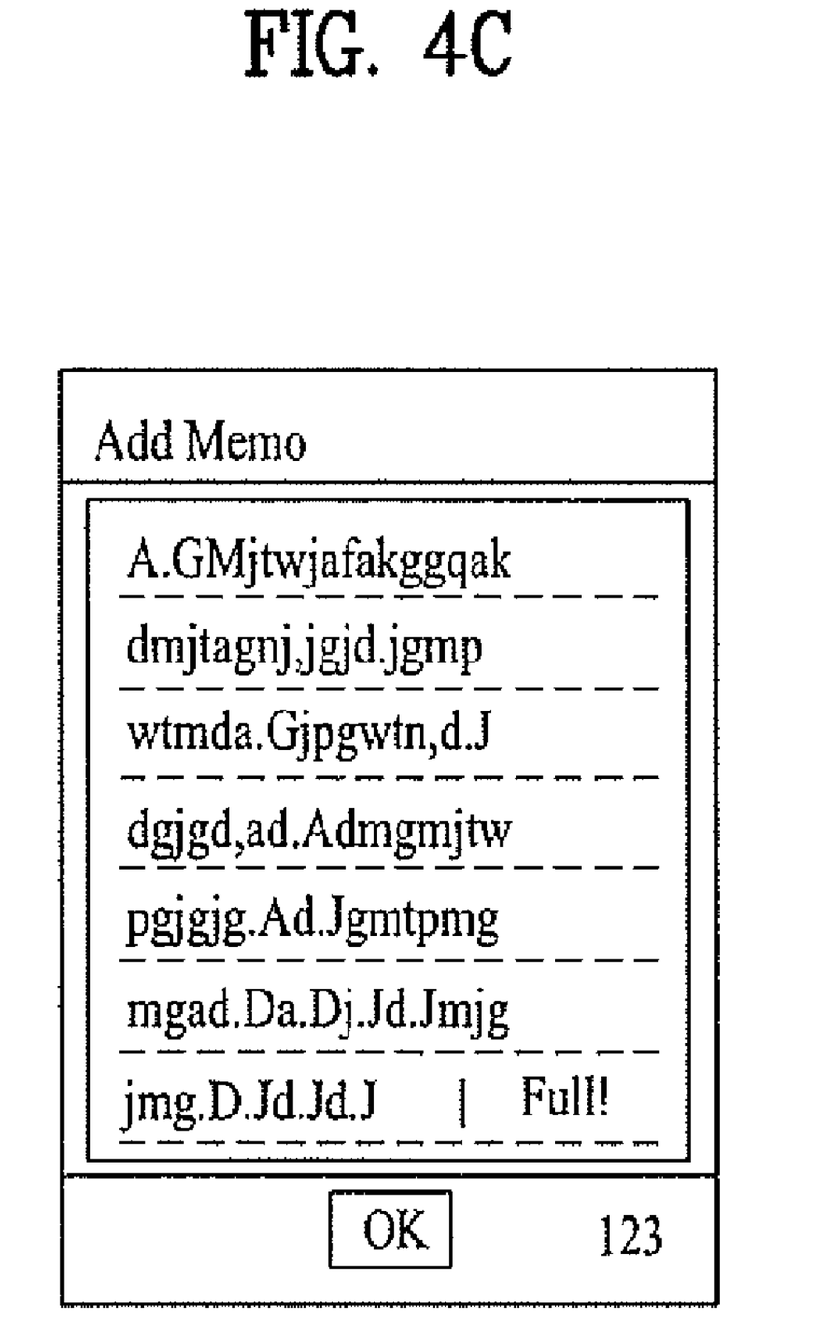

FIGS. 4A to 4C illustrate an exemplary graphical user interface according to an aspect of the present invention.

The graphical user interface shown in FIG. 4A displays text entered by a user ("A.G") in a text entry window, and displays an indication or available character capacity ("185") in the text entry window adjacent to a cursor marking the ending of the entered text. In this case, the user may enter 185 more characters before reaching the character capacity limit. Although not shown in FIG. 4A, the "185" indication may be of a different size with the entered text. For example, it may be displayed as a superscript or subscript at the end of the entered text. Alternatively, the "185" indication may be displayed in a different color.

FIG. 4B shows the graphical user interface of FIG. 4A when the available character capacity is 150.

FIG. 4C shows the graphical user interface when the available character capacity is zero. As shown in FIG. 4C, the word "full" is displayed as the indication of the available character capacity at the end of the entered text. Although not shown in FIG. 4C, the word "full" may blink, and/or the entered text may blink.

Figure 5A:
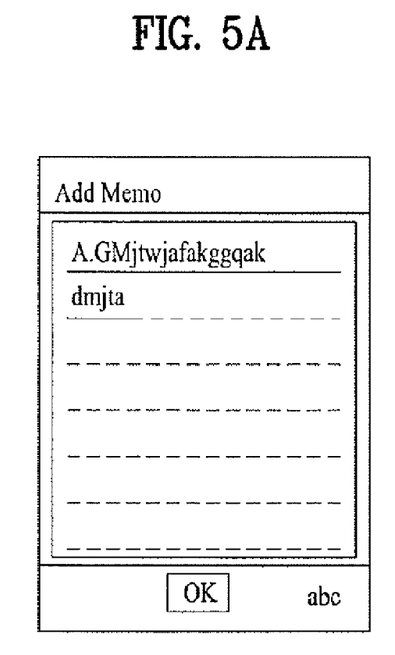
FIGS. 5A and 5B illustrate an exemplary graphical user interface according to another aspect of the present invention.
Figure 5B:
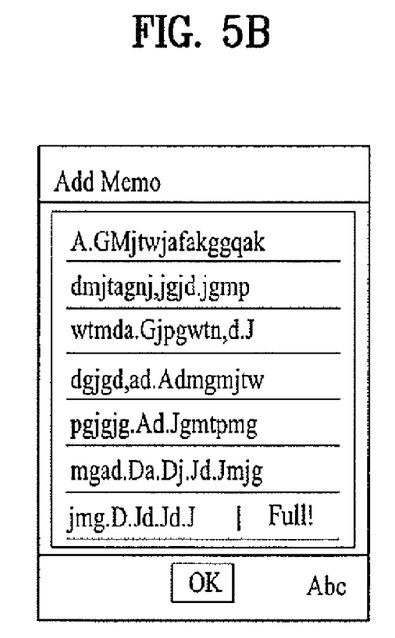

FIGS. 5A and 5B illustrate an exemplary graphical user interface according to another aspect of the present invention.

In the graphical user interface shown in FIG. 5A the text entered by the user is underlined. The color and/or brightness of the underline changes in accordance with the value of the available character capacity. FIG. 5B shows the graphical user interface when the available character capacity is zero.

As apparent from the above description, the graphical user interface described above allows a user, when entering text, to view an indication of an available character capacity of the text without diverting his view from the text being entered.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In accordance with various embodiments of the present disclosure, the methods described herein may be implemented by software programs executable by the controller 206. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of displaying an available character capacity in a character entry window, comprising:
    calculating the available character capacity and available character capacity percentage based on characters entered by a user;
    displaying the entered characters in the character entry window;
    displaying an indication of the available character capacity at a position in the character entry window adjacent to a last character entered by the user when the available character capacity percentage is between a first value and a second value, wherein the position of the displayed indication of the available character capacity automatically changes to a new corresponding position for each of a plurality of additional characters entered by the user;
    changing the color, of the indication of the available character capacity when the available character capacity percentage is between the second value and a third value, wherein the second value is less than the first value and the second value is greater than the third value; and
    changing a display type of the indication of the available character capacity from a number to a text when the available character capacity percentage is zero.

2. The method according to claim 1, wherein the indication of the available character capacity is displayed adjacent to a cursor.

3. The method according to claim 1, further comprising setting the character capacity value by a user.

4. The method according to claim 1, wherein changing the color of the indication when the available character capacity percentage is between the second value and the third value includes changing a color of the displayed indication of the available character capacity based on a change of the number of the entered characters.

5. The method according to claim 1, further comprising calculating a character capacity for each page and a character capacity for an entire message and displaying an indication of the available character capacity of the page and an indication of the available character capacity of the entire message.

6. The method according to claim 1, wherein the available character capacity percentage is a percentage of character capacity still available.

7. The method according to claim 1, wherein the displayed indication further blinks.

8. The method according to claim 1, wherein the characters entered by the user are underlined.

9. The method according to claim 1, further comprising changing the color of the indication of the available character capacity when the available character capacity percentage is between the third value and a fourth value less than the third value.

10. The method according to claim 1, wherein when a message is more than one page, the indication of the available character capacity is displayed based on the available character capacity percentage of the currently displayed page.

11. A method of displaying an available character capacity, comprising:
 calculating the available character capacity and available character capacity percentage based on characters entered by a user;
 displaying the entered characters;
 displaying a background in a first specific color when the calculated available character capacity percentage is between a first value and a second value;
 displaying the background in a second specific color when the calculated available character capacity percentage is between the second value and a third value, wherein the second value is less than a first value and the second value is greater than the third value; and
 changing a display type to a text when the available character capacity percentage is zero.

12. The method according to claim 11, wherein the third value is zero.

13. The method according to claim 11, further comprising displaying the background in a third specific color when the available character capacity percentage is between the third value and a fourth value less than the third value.

14. The method according to claim 11, wherein when a message is more than one page, the background is displayed based on the available character capacity percentage of the currently displayed page.

15. A terminal that displays an available character capacity in a character entry window, comprising:
 an input unit for entering characters;
 a display that displays the character entry window;
 a controller that calculates the available character capacity and available character capacity percentage based on characters entered by a user, controls the display to display the entered characters in the character entry window, and controls the display to display an indication of the available character capacity at a position in the character entry window adjacent to a last character entered by the user when the available character capacity percentage is between a first value and a second value, and to automatically change the position of the displayed indication of the available character capacity to a new corresponding position for each of a plurality of additional characters entered by the user, wherein the controller changes the color of the indication of the available character capacity when the available character capacity percentage is between the second value and a third value, wherein the second value is less than the first value and the second value is greater than the third value, and the controller changes a display type of the indication of the available character capacity from a number to a text when the available character capacity percentage is zero.

16. The terminal according to claim 15, wherein the controller controls the display to display the indication of the available character capacity adjacent to a cursor.

17. The method according to claim 15, further comprising changing the color of the indication of the available character capacity when the available character capacity percentage is between the third value and a fourth value less than the third value.

18. The terminal according to claim 15, wherein when a message is more than one page, the controller displays the indication of the available character capacity based on the available character capacity percentage of the currently displayed page.

19. The terminal according to claim 15, wherein the controller changes the color of the indication by changing the color of the indication when the available character capacity percentage is between the second value and the third value.

20. A terminal that displays an available character capacity, comprising:
 an input unit for entering characters;
 a display that displays the entered characters and a background;
 a controller that calculates the available character capacity and available character capacity percentage based on the characters entered by a user, controls the displays to display the entered characters, and controls the display to display the background in a first specific color when the calculated available character capacity percentage is between a first value and a second value, and controls the display to display the background in a second specific color when the calculated available character capacity percentage is between the second value and a third value, and wherein the second value is less than a first value and the second value is greater than the third value, and the controller changes a display type to a text when the available character capacity percentage is zero.

21. The terminal according to claim 20, wherein the third value is zero.

22. The terminal according to claim 20, wherein the controller displays the background in a third specific color when the available character capacity percentage is between the third value and a fourth value less than the third value.

23. The terminal according to claim 20, wherein when a message is more than one page, the controller displays the background based on the available character capacity percentage of the currently displayed page.

* * * * *